United States Patent
Sherwood et al.

[11] Patent Number: 5,103,877
[45] Date of Patent: Apr. 14, 1992

[54] VAPOR-LIQUID SEPARATOR FOR EVAPORATIVE EMISSIONS CONTROL SYSTEM

[75] Inventors: Carl H. Sherwood, Brockport; Keneth W. Turner, Webster, both of N.Y.

[73] Assignee: General Motors Corporation, Detroit, Mich.

[21] Appl. No.: 685,246

[22] Filed: Apr. 15, 1991

[51] Int. Cl.⁵ .................................................. B65B 31/06
[52] U.S. Cl. ........................................ 141/59; 141/44; 141/302; 141/307; 220/86.2; 220/746; 220/748; 137/588; 123/519
[58] Field of Search .................... 141/44-46, 141/59, 198, 291, 292, 301-309; 220/86.2, 86.3, 745-749; 137/200, 587-589; 55/168, 387; 123/518, 519

[56] References Cited

U.S. PATENT DOCUMENTS

| | | | |
|---|---|---|---|
| 2,874,712 | 2/1959 | Eshbaugh | 220/86.2 |
| 4,266,574 | 5/1981 | Tilling | 141/302 X |
| 4,630,749 | 12/1986 | Armstrong et al. | 220/86.2 |
| 4,673,009 | 6/1987 | Giacomazzi et al. | 141/198 |
| 4,699,638 | 10/1987 | Harris | 55/168 |
| 4,706,708 | 11/1987 | Fornuto et al. | 137/588 |
| 4,719,949 | 1/1988 | Mears | 141/301 |
| 4,724,861 | 2/1988 | Covert et al. | 141/59 X |
| 4,747,508 | 5/1988 | Sherwood | 220/86.2 |
| 4,765,504 | 8/1988 | Sherwood et al. | 220/86.2 |
| 4,790,349 | 12/1988 | Harris | 137/588 |
| 4,809,863 | 3/1989 | Woodcock et al. | 220/86.2 X |
| 4,813,453 | 3/1989 | Jenkins et al. | 137/588 |
| 4,821,908 | 4/1989 | Yost | 220/86.2 |
| 4,836,835 | 6/1989 | Harris et al. | 55/168 |
| 4,869,283 | 9/1989 | Oeffling et al. | 141/59 X |
| 4,874,020 | 10/1989 | Bucci | 141/59 |
| 4,877,146 | 10/1989 | Harris | 220/86.2 |
| 4,881,578 | 11/1989 | Rich et al. | 141/44 |
| 4,887,578 | 12/1989 | Woodcock et al. | 123/519 |
| 4,917,157 | 4/1990 | Gifford et al. | 141/59 |
| 4,932,444 | 6/1990 | Micek | 141/59 |
| 4,955,950 | 9/1990 | Seiichi et al. | 141/46 |
| 5,014,742 | 5/1991 | Covert et al. | 137/588 |
| 5,027,868 | 7/1991 | Morris et al. | 141/59 |
| 5,033,517 | 7/1991 | Bucci | 141/59 |
| 5,035,729 | 7/1991 | Hodgkins | 55/168 |
| 5,054,508 | 10/1991 | Benney | 137/587 X |
| 5,054,520 | 10/1991 | Sherwood et al. | 137/587 |

OTHER PUBLICATIONS

SAE Technical Paper Series 861551, "Vehicle Onboard Control of Refueling Emissions—System Demonstration on a 1985 Vehicle" by W. J. Koehl, D. W. Lloyd and L. J. McCabe. International Fuels and Lubricants Meeting in Philadelphia, Pa., Oct. 6-9, 1986.

*Primary Examiner*—Henry J. Recla
*Assistant Examiner*—Casey Jacyna
*Attorney, Agent, or Firm*—Patrick M. Griffin

[57] ABSTRACT

A tank vapor vent valve for a vehicle on board fuel emissions vapor recovery system has a liquid-vapor separator integrated into its design. A blocking valve is held closed when the tank is not being filled, but springs open when the nozzle is inserted to fill the tank, allowing venting flow out of the tank. A cup suspended below the valve catches entrained liquid fuel to keep it out of the canister line, and pulls the blocking valve shut when full. When the nozzle is removed, a drain plug at the bottom of the cup is automatically pushed open.

3 Claims, 5 Drawing Sheets

VAPOR-LIQUID SEPARATOR FOR EVAPORATIVE EMISSIONS CONTROL SYSTEM

This invention relates to vehicle fuel evaporative emissions controls in general, and specifically to a vapor vent valve assembly that admits fuel vapor to a vapor storage canister, while excluding entrained liquid fuel.

BACKGROUND OF THE INVENTION

The vapor storage canisters that are by now standard components in production vehicle fuel systems contain activated carbon that can adsorb vaporized fuel, but which should be protected from direct contact with liquid fuel. Various floats and so called rollover valves are adequate to protect the canister from the direct entry of liquid fuel when the tank is overfilled or tilts excessively. The mixture that collects in the space above the liquid level also contains entrained liquid fuel, however, which can potentially present a problem. The canister may be called upon in future designs to adsorb the large volume of flow that is pushed out of the tank as the tank is filled, the so called fuel fill losses. Fuel fill losses contain a high percentage of entrained liquid fuel, because of the churning effect of the forcefully entering fuel, and separators may be needed to protect the canister carbon bed.

Proposed systems for recovering fuel fill losses use vapor vent valves that route the displaced flow to the canister, but which are closed when the tank is not being filled. Such vapor vent valves are typically incorporated in the fuel tank filler pipe, near the entry point of the filler nozzle, as this is a convenient way to activate various opening and closing mechanisms. They may also be mounted elsewhere, however, so long as they provide an exit path from the vapor space of the fuel tank to the canister, a path that can be selectively opened and closed. Known vapor-liquid separators for tank vapor vent valves are generally somewhat bulky, and not integrated with the vapor vent valve itself. They are also not self limiting, meaning that they do not automatically shutoff and stop flow to the canister when they have separated a given volume of entrained liquid from the flow.

SUMMARY OF THE INVENTION

The invention discloses a tank vapor vent valve assembly that does incorporate a vapor-liquid separator as an integral part of the assembly. It is self limiting, with a provision for blocking flow when full, and also has a provision for automatically draining at the end of the fill operation.

In the preferred embodiment disclosed, a housing fixed to the top of the fuel tank filler pipe opens both to the inside of the filler pipe, and to a vapor vent line that runs to the canister. Inside the housing, a blocking valve that opens or closes to allow or block flow through the housing is spring biased up toward the open position. A first shutoff means in the form of a spring loaded lever located above the housing and a slidable stem pushed down by the lever keeps the blocking valve normally closed. When the fill nozzle is inserted, however, it rotates the lever up and releases the stem and blocking valve to spring open, suspended in the housing below the blocking valve is a reservoir in the form of a cup, which is spring biased toward a raised position, but which will sink down when it is full of liquid fuel. A second shutoff means in the form of a sliding sleeve on which the cup is hung pulls the blocking valve down and closed when the cup is full, acting independently of the first shutoff means. The reservoir cup also has a spring loaded drain plug at the bottom that is pushed open by the sliding stem every time the nozzle is removed, so as to drain the cup automatically back into the filler pipe.

At the beginning of fill, the inserted nozzle passes through a wiping seal and opens the blocking valve. The mixture displaced from the fuel tank by the entering liquid fuel is forced to exit through the housing, and flows over the reservoir cup. Entrained liquid fuel falls into and collects in the cup until it sinks, closing the blocking valve. This stops the filling operation, at least temporarily, because venting of the tank is prevented. When the nozzle is removed, the sliding stem pushes the drain valve open, emptying the cup. Filling can then be resumed, if the tank is not yet full. If the cup does not fill up completely and sink, the fueling operation proceeds without interruption. When the nozzle is finally removed and the filler pipe capped, the lever pushes the blocking valve back to its closed position, preventing any liquid fuel that sloshes up the filler pipe from reaching the vapor line and canister.

It is, therefore, a general object of the invention to provide a tank vapor vent valve assembly with a vapor-liquid separator incorporated therein.

It is another object of the invention to provide such a valve assembly that is self limiting, and which shuts off when it is full of separated liquid.

It is another object of the invention to provide such a valve assembly that is self draining, emptying automatically when the fill operation is concluded.

DESCRIPTION OF THE PREFERRED EMBODIMENT

These and other objects and features of the invention will appear from the following written description, and from the drawings, in which.

Figure 1:
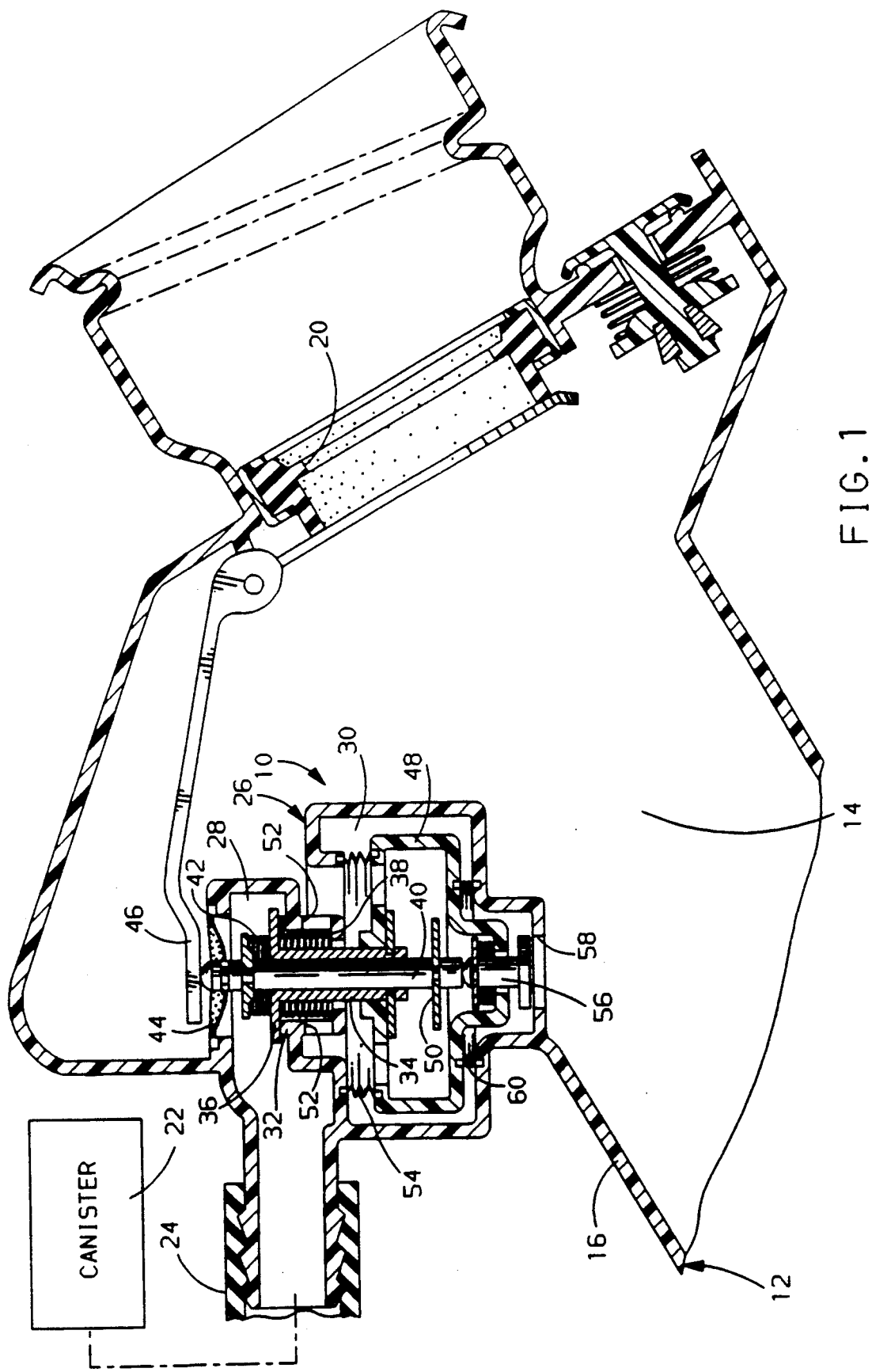
FIG. 1 is a cross section through the top of a vehicle fuel tank filler pipe incorporating a preferred embodiment of the vapor vent valve assembly of the invention before fill commences.
Figure 3:
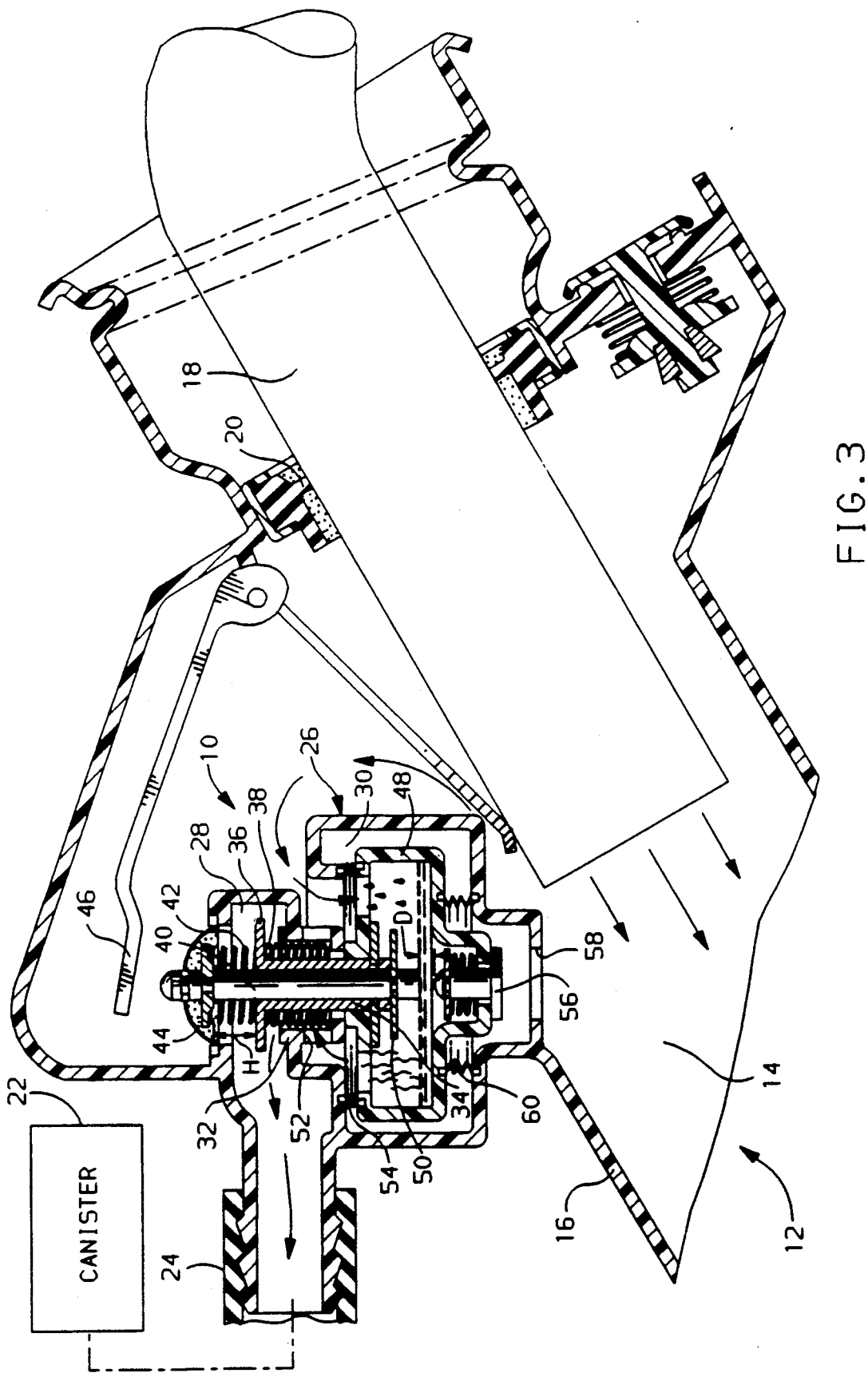
FIG. 3 shows the nozzle inserted at the beginning of the fill operation, with flow through the valve, and before the reservoir cup has filled completely.

Referring first to FIGS. 1 and 3, a preferred embodiment of a vapor vent valve assembly made according to the invention is indicated generally at 10. Valve assembly 10 is incorporated in a vehicle fuel system that includes a fuel storage tank, indicated generally at 12. Tank 12 has a space 14 in which a mixture of fuel, both vaporized and in entrained liquid form, collects. Here, that space 14 includes the interior of the filler pipe 16. Filler pipe 16 is similar to others in which a vapor vent valve is incorporated. It is closed by a standard threaded cap, not illustrated, and receives a standard fuel filler nozzle 18 inserted through a wiping seal 20 at the start of the fill operation. The seal 20 assures that the volume of liquid fuel entering tank 12 will not push a comparable volume of that mixture out of space 14 to atmosphere. Instead, it will ultimately be routed to a standard carbon filled vapor canister 22, through a vapor line 24. It passes first through valve assembly 10, however, details of which are described next.

Figure 2:
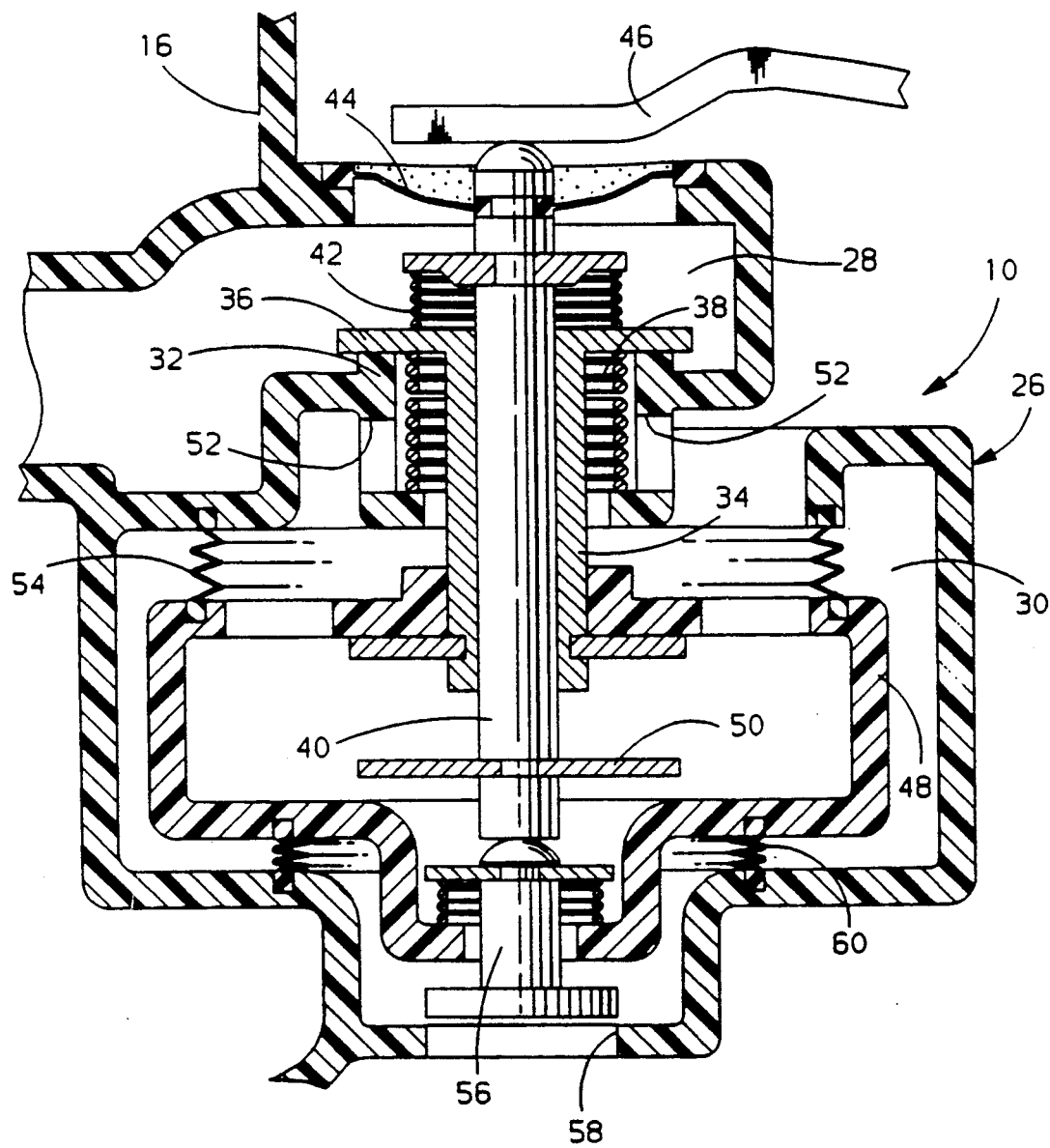
FIG. 2 is an enlargement of just the valve assembly from FIG. 1.

Referring next to FIGS. 1 and 2, vapor vent valve assembly 10 includes a generally cylindrical main housing, indicated generally at 26, which contains other components, and which provides various internal flow and drain paths for both vapor and liquid fuel. Housing 26 is shown integral with the top of filler pipe 16, both being formed of a suitable fuel resistant plastic. In practice, as will be recognized by those skilled in the art, housing 26 would be molded and built up in several convenient component parts that could be spun welded or cemented together as valve assembly 10 was built up. Housing 26 is divided into two basic chambers, an upper chamber 28 and lower chamber 30, which open to one another across a short tubular valve seat 32. Since valve seat 32 is interposed between space 14 and vapor line 24, blocking it or unblocking it will act to control flow therebetween. Extending coaxially through tubular valve seat 32 is a cylindrical sleeve 34 with a round flange 36 at the top, larger in diameter than valve seat 32. Sleeve 34 has some radial clearance from the inside of valve seat 32, enough to contain a resilient means in the form of a compression coil spring 38 that biases flange 36 continually up and away from valve seat 32. In FIG. 2, however, spring 38 is compressed down and flange 36 blocks the top of valve seat 32. The closed position is maintained by additional structure, described next.

Referring next to FIGS. 2 and 3, a first shutoff means includes a stem 40 that is closely slidably received through sleeve 34. Therefore, stem 40 and sleeve 34 can move independently of one another, though they maintain themselves coaxial. Stem 40 is continually biased upwards relative to sleeve 34 by a second resilient means in the form of a compression spring 42. Spring 42 bears against the upper surface of flange 36, just above and coaxial with spring 38. The upper end of stem 40 protrudes from upper chamber 28 through a sealing diaphragm 44, and is engageable by a spring loaded, wish bone shaped lever 46. Lever 46 is biased continually in the counterclockwise direction with a torque strong enough to compress both springs 38 and 42. Consequently, lever 46 normally pushes stem 40 and flange 36 down to the closed position. However, when nozzle 18 is inserted, it rotates lever 46 clockwise away from stem 40, allowing both springs 38 and 42 to expand and move both sleeve 34 and stem 40 up, and opening valve seat 32. Sleeve 34 is limited in how far it can slide up by a reservoir in the form of a cup 48 that hangs on the bottom of sleeve 34, suspended within lower chamber 30, and surrounding the lower end of stem 40. Cup 48 hits the bottom of valve seat 32 to limit the expansion of spring 38. However, cup 48 serves a more fundamental purpose than just acting as a stop member, described next. Stem 40 is limited in how far it can slide up within sleeve 34 by a washer 50 fixed near the bottom of stem 40, which hits the bottom of sleeve 34. Thus, spring 42 is maintained in an expanded state with a height H, if it is not acted upon by an external compressive force.

Referring next to FIG. 3, the operation of valve assembly 10 during fuel fill is illustrated. Tubular valve seat 32 has several apertures 52 through its side, which are open to space 14. When nozzle 18 is inserted and flange 36 springs up and away from the top of valve seat 32, a flow path is opened from space 14 into upper chamber 28. As fuel flows in, the mixture in tank 12 of fuel vapor and entrained liquid fuel is displaced and follows that flow path, as shown by the arrows. Fuel vapor flows into vapor line 24, and ultimately to canister 22. Entrained liquid droplets fall from the flow, under the force of gravity, into the suspended cup 48, and not into vapor line 24. An upper bellows 54 joined between cup 48 and the inside of housing 28 prevents any separated liquid from getting into the lower chamber 30.

Figure 4:
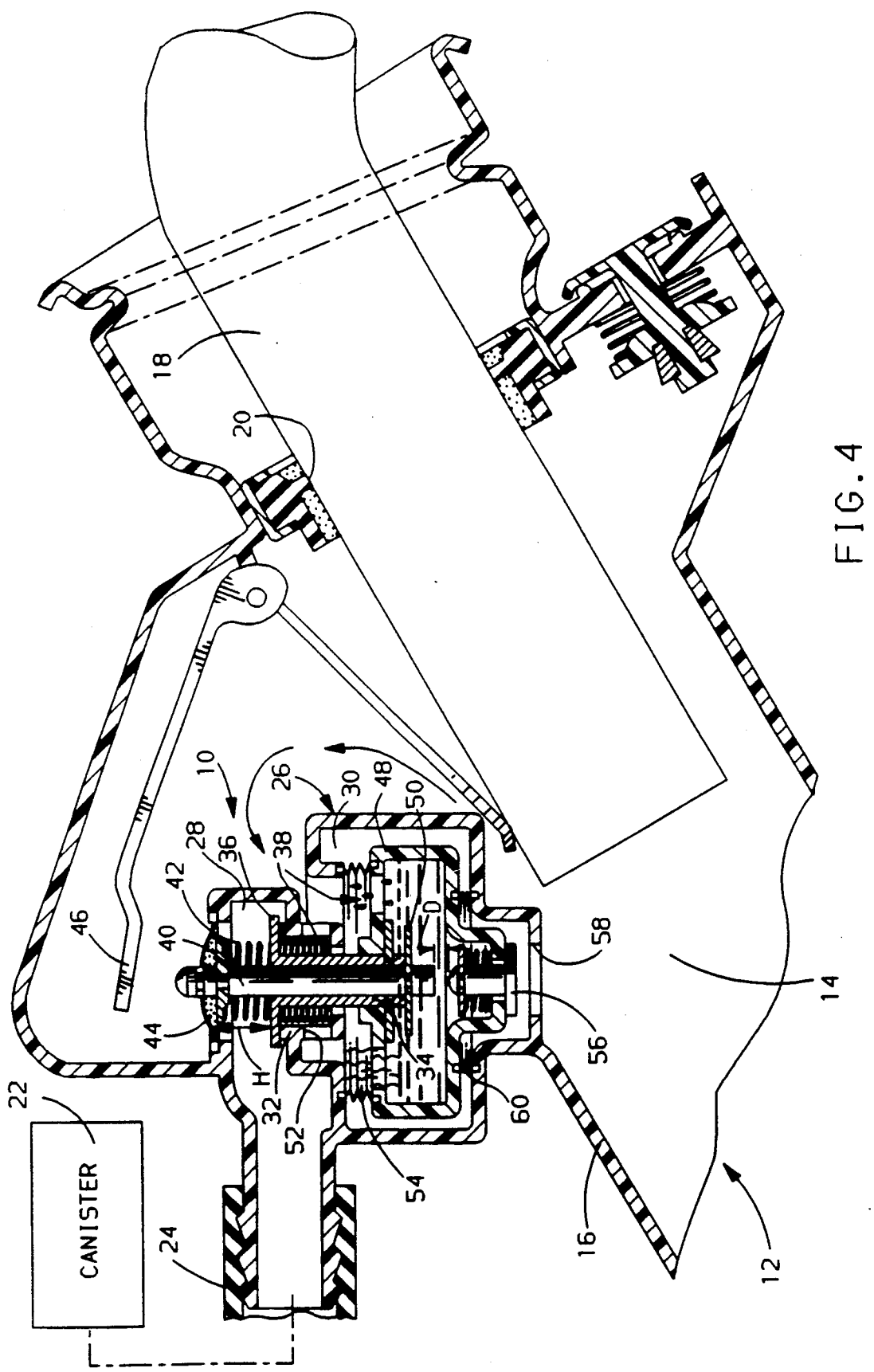
FIG. 4 is a view after the cup has filled, sunk down, and pulled the blocking valve shut.

Referring next to FIG. 4, when enough liquid fuel falls into cup 48 to fill it to capacity, the weight pulling down on sleeve 34 will be enough to compress spring 38, allowing cup 48 to sink. Flange 36 is pulled back down until it hits and blocks the top of valve seat 32. Thus, sleeve 34, with the cup 48 hung on it, is able to act automatically as a second shutoff means, independent of stem 40 and lever 46. With valve seat 32 blocked, flow into vapor line 24 is blocked, and liquid fuel will be forced up filler pipe 16. Stem 40 is pulled down too, to an extent, from its FIG. 3 position, as the bottom of sleeve 34 hits washer 50, but spring 42 stays expanded. When rising fuel reaches nozzle 18, it will shutoff automatically, signalizing end of fill, regardless of whether tank 12 is completely full. The driver, understanding the operation of valve assembly 10, will know to check whether tank 12 is in fact sufficiently full. If not, only a very simple operation is necessary to recommence fill, described next.

Figure 5:
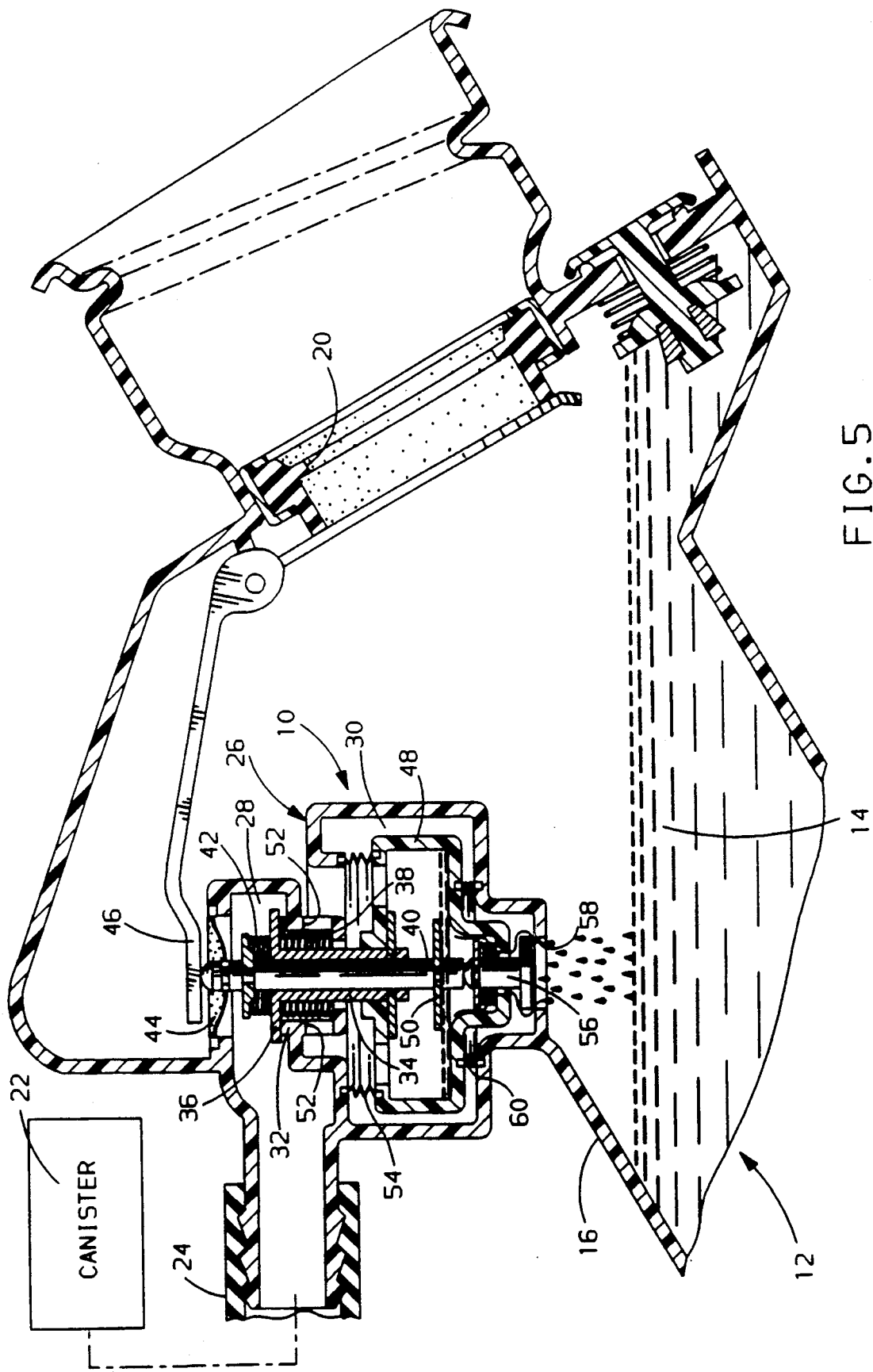
FIG. 5 is a view after the nozzle has been withdrawn and the blocking valve has again been pushed shut, opening the drain valve to empty the cup.

Referring last to FIG. 5, an additional feature of valve assembly 10 is illustrated. To unblock valve seat 32 and allow additional filling of tank 12, cup 48 has to be emptied, so that it can rise and allow spring 38 to expand. A automatic emptying of cup 48 is provided by a spring loaded drain plug 56 at the bottom of cup 48 that rests over a drain hole 58 in the bottom of lower chamber 30. So long as spring 42 stays expanded to pull washer 50 against the bottom of sleeve 34, the lower end of stem 40 is maintained above drain plug 56 by a distance D that is less than H, regardless of whether cup 48 is empty or full. All the driver need do is remove nozzle 18, the usual procedure at end of fill. Lever 46 will rotate back, compressing spring 42 and pushing stem 40 down through sleeve 34 an additional distance sufficient to hit plug 56 and open it, draining cup 48 through drain hole 58. A lower bellows 60 joined between cup 48 and the inside of housing 26 prevents draining liquid fuel from getting between cup 48 and the inside of lower chamber 30. Cup 48 will not rise back up after being drained, since lever 46 and stem 40 are still holding sleeve 34 down. Once emptied, however, cup 48 will be able to rise and open valve seat 32 when nozzle 18 is again inserted.

Variations in the disclosed embodiment could be made. As far as the physical location of valve assembly 10, it is particularly advantageous that it be located near the top of filler pipe 16, so as to be close to the insertion of nozzle 18. However, various remote activation mechanisms are known, so that valve assembly 10 could open through the top of tank 12, at a more remote location. Resilient means other than the compression springs 38 and 42 could be used to give the sleeve 34 and stem 40 a continual and independent upward bias. For example, the diaphragm 44 could conceivably be made resilient, if only a very short stroke were needed for stem 40. The use of the two springs 38 and 42 presents a very compact and efficient arrangement, since they act independently, but bear on a common part, the flange 36.

They also coaxially surround the same part, stem 40, so as to occupy little additional radial space. Some other shutoff means could be provided through which the sinking action of the filled cup 48 could be translated into a blocking of the valve seat 32. One possibility would be to hang cup 48 on a lever and fulcrum that would provide a mechanical advantage in translating its weight into the compression of spring 38 when full. Suspending the cup 8 on the lower end of the sleeve 34 is particularly compact and efficient as to the number of components, however. The sleeve 34 provides or cooperates in providing numerous functions, including blocking and unblocking valve seat 32, suspending cup 48, translating the sinking of cup 48 to the flange 36, guiding the stem 40 as it slides up and down independently through the center of sleeve 34, and limiting the compression of spring 38. A differently activated drain plug could be used, such as one that had its own dedicated opening device which the operator would separately push. The use of the stem 40 as disclosed also helps to reduce components and size, because it allows the stem 40 to serve multiple functions, acting both as an independent shutoff means for valve seat 32 and as an automatically acting opener for drain plug 56. Therefore, it will be understood that it is not intended to limit the invention to just the preferred embodiment disclosed.

The embodiments of the invention in which an exclusive property or privilege is claimed are defined as follows:

1. In a vehicle having a liquid fuel storage tank with a vapor space in which a mixture of fuel vapor and entrained liquid fuel collects during tank fill, a fuel vapor storage canister, and a vapor line running to said canister, a vapor vent valve assembly for admitting fuel vapor to said vapor line while excluding entrained liquid fuel, comprising,
   a blocking valve movable between an open position allowing flow from said tank vapor space into said vapor line and a closed position blocking said flow,
   a resilient means biasing said blocking valve toward its open position,
   a reservoir movably suspended beneath said blocking valve and exposed to the flow therethrough when said blocking valve is open so that entrained liquid fuel may settle out therein, said reservoir further being adapted to sink from a normal position to a lowered position when full,
   a first shutoff means adapted to compress said resilient means and push said blocking valve to its closed position when said fuel tank is not being filled and to release said blocking valve to return to its open position when said fuel tank is being filled,
   a second shutoff means adapted to independently compress said resilient means and pull said blocking valve to its closed position when said reservoir sinks, and,
   a drain valve in said reservoir to drain said reservoir and allow said reservoir to rise back to its normal position,
   whereby, said vapor line is open to said tank vapor space only during fuel fill, and only when said reservoir is not yet full, so that entrained liquid in said flow will be substantially excluded from said vapor line.

2. In a vehicle having a liquid fuel storage tank with a vapor space in which a mixture of fuel vapor and entrained liquid fuel collects during tank fill, a fuel vapor storage canister, and a vapor line running to said canister, a vapor vent valve assembly for admitting fuel vapor to said vapor line while excluding entrained liquid fuel, comprising,
   a tubular valve seat interposed between said vapor space and vapor line,
   a sleeve extending slidably through said valve seat including a flange near its upper end large enough to block said valve seat,
   a resilient means biasing said sleeve flange up and away from said valve seat,
   a reservoir cup suspended near the lower end of said sleeve beneath said valve seat so that entrained liquid fuel in flow through said valve seat may settle out therein, said reservoir cup further being of sufficient volume so as to sink, when full, and pull said sleeve down to block said valve seat,
   a stem slidably received through said sleeve and adapted to compress said resilient means and independently push said sleeve down to block said valve seat when said fuel tank is not being filled and to release said sleeve to move back up when said fuel tank is being filled, and,
   a drain valve in said reservoir cup to drain said reservoir cup and allow said reservoir cup to rise back to its normal position,
   whereby, said vapor line is open to said tank vapor space only during fuel fill, and only when said reservoir cup is not yet full, so that entrained liquid in said flow will be substantially excluded from said vapor line.

3. In a vehicle having a liquid fuel storage tank with a vapor space in which a mixture of fuel vapor and entrained liquid fuel collects during tank fill, a fuel vapor storage canister, and a vapor line running to said canister, a vapor vent valve assembly for admitting fuel vapor to said vapor line while excluding entrained liquid fuel, comprising,
   a tubular valve seat interposed between said vapor space and vapor line,
   a sleeve extending slidably through said valve seat including a flange near its upper end large enough to block said valve seat,
   a first resilient means biasing sleeve flange up and away from said valve seat,
   a reservoir cup suspended near the lower end of said sleeve beneath said valve seat so that entrained liquid fuel in flow through said valve seat may settle out therein, said reservoir cup further being of sufficient volume so as to sink, when full, and pull said sleeve down to block said valve seat,
   a stem slidably received through said sleeve and partially into said reservoir cup, said stem being adapted to compress said first resilient means when pushed downwardly to push said flange against said valve seat and block said valve seat,
   a second resilient means biasing said stem upwardly relative to said sleeve independently of said first resilient means and adapted to maintain a predetermined axial expansion,
   a drain valve in said reservoir cup located below said stem and spaced therefrom by a distance less than said predetermined axial expansion, said drain valve being adapted to drain said reservoir cup when opened to allow said reservoir cup to rise back to its normal position, and,
   a spring loaded lever adapted to normally maintain both said first and second resilient means compressed, but movable by the insertion of said nozzle so as to release both first and second resilient means to expand, whereby, said vapor line opens to said tank vapor space through said valve seat only when said nozzle is inserted and is blocked automatically by said stem flange when said reservoir cup fills and sinks, so that entrained liquid in said flow will be substantially excluded from said vapor line, said reservoir cup also draining automatically when said nozzle is removed and said spring loaded lever pushes said stem back down to compress said second resilient means.

* * * * *